Jan. 2, 1945. H. E. MALONE 2,366,346
INCLINOMETER
Filed Aug. 1, 1942 2 Sheets-Sheet 1

INVENTOR.
HOMER E. MALONE
BY
ATTORNEY.

Jan. 2, 1945.   H. E. MALONE   2,366,346
INCLINOMETER
Filed Aug. 1, 1942   2 Sheets-Sheet 2

INVENTOR.
BY HOMER E. MALONE
ATTORNEY.

Patented Jan. 2, 1945

2,366,346

UNITED STATES PATENT OFFICE 2,366,346

INCLINOMETER

Homer E. Malone, Milwaukee, Wis., assignor to Perfex Corporation, Milwaukee, Wis., a corporation of Wisconsin Application August 1, 1942, Serial No. 453,167

4 Claims. (Cl. 33—220)

This invention relates in general to indicating and controlling instruments and more particularly to instruments for indicating inclination and/or acceleration of aircraft or other vehicles and devices.

In handling aircraft, it is desirable to have a reliable indication of the ship's inclination. This is especially desirable in the case of modern bombing planes which carry their bombs in the fuselage. Such bombers must be fairly level when the bombs are released in order that the bombs may fall from their racks through the bomb bay doors. If the plane is inclined too far one way or the other when the bombs are released, there is danger that the bombs may strike the floor of the bomb bay.

The primary object of this invention consists in the provision of a simple and reliable instrument for indicating the inclination of the object upon which it is mounted.

In such bombing planes, it is also important that the bombs are not released if the plane is accelerating or decelerating beyond certain limits. Such acceleration or deceleration has the same effect as inclination. Thus if the plane is accelerating when the bombs are released, the acceleration is not imparted to the bombs after release. As a result, the plane moves forwardly with respect to the bombs while the bombs are falling from the racks. If the acceleration is great enough, the bombs will not fall clear of the plane.

Another object of this invention consists in the provision of an instrument which responds to acceleration or deceleration.

A further object of the invention is the provision of an instrument of the type mentioned which is adapted for mounting upon an instrument panel, the indication of the inclination and/or acceleration being performed by a dial and pointer.

Another object consists in the provision of a condition responsive instrument with a simple vibration dampening arrangement which has minimum effect upon the sensitivity of the instrument.

A further object consists in the provision of an instrument of the type described which actuates a controlling device such as a switch and which is readily adjustable for varying the point at which the switch is operated. Another object consists in the provision of a simple arrangement for adjusting such instrument and for indicating the adjustment thereof.

Other objects will appear from the following description and appended claims.

For a full disclosure of the invention, reference is made to the following detailed description and to the accompanying drawings, in which Fig. 1 is a cut-away top view of the instrument, partly in section;

Figure 5:
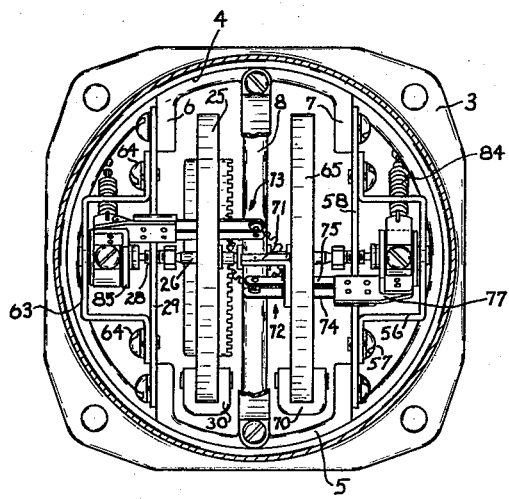
Fig. 5 is a rear view taken on line 5—5 of Fig. 2.

Referring to the drawings, reference character 1 indicates generally a base member having a hollow cylindrical front portion 2, this front portion being formed with an integral mounting flange 3 for mounting the instrument upon a suitable instrument panel. Extending rearwardly from the front portion 2 are upper and lower brackets 4 and 5 respectively. As shown in Fig. 5, the bracket 4 is arcuate in shape and is formed with downwardly depending flanges 6 and 7 at each side. The bracket 5 is similar to the bracket 4 but is provided with upwardly extending flanges in alignment with the flanges 6 and 7. The outer ends of the brackets 4 and 5 are joined by a web 8, this web extending vertically as shown in Fig. 5 and being midway between the flanges 6 and 7.

Figure 4:
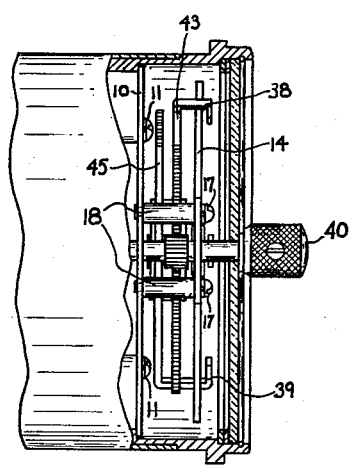
Fig. 4 is a fragmentary side view similar to Fig. 2, but showing the pointer adjustment mechanism.
Figure 6:
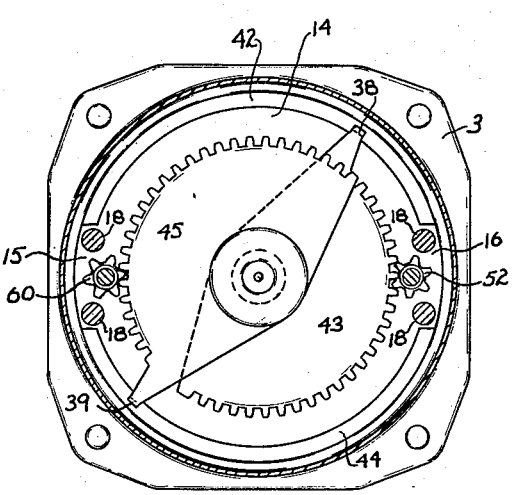
Fig. 6 is a sectional view taken on line 6—6 of Fig. 1.

The interior of the front portion 2 is formed with a shoulder 9 for receiving a generally circular cross plate 10, this plate being held in place by screws such as 11 and 12, which are received in the flange portions of the bracket members 4 and 5. This plate serves to support a circular dial 14 which is of smaller diameter than the interior of the annular shaped portion 2. As shown in Fig. 6, the dial member 14 is provided with ears 15 and 16 at each side. These ears are fastened by screws 17 (Fig. 4) to spacer members 18, which are in turn secured to the cross plate 10. The dial is covered by a glass 20 held in place by a snap ring 21. Preferably suitable annular gaskets 22 are interposed between the back of the glass and the retaining shoulder formed on the front portion 2 of base member 1.

Reference character 25 indicates a wheel shaped member which forms a part of an inclination or acceleration responsive mechanism. This member is provided at its center with an axle 26, the ends of which are preferably of conical shape. One end of axle 26 is received in an insert 27 located in the vertically extending web 8. The other end of the axle is received in a counter-sunk adjusting screw 28. This adjusting screw is carried on a strip 29 (Fig. 5) which is secured to the flange 6 of the upper bracket 4 and to the corresponding flange of the lower bracket 5. Attached to the lower part of the wheel 25 is a U-shaped weight 30. This weight cooperates with the wheel 25 to form a pendulum. In other words, the weight 30 serves to hold the wheel stationary with the weight lowermost, irrespective of rotation or inclination of the base member.

Figure 1:
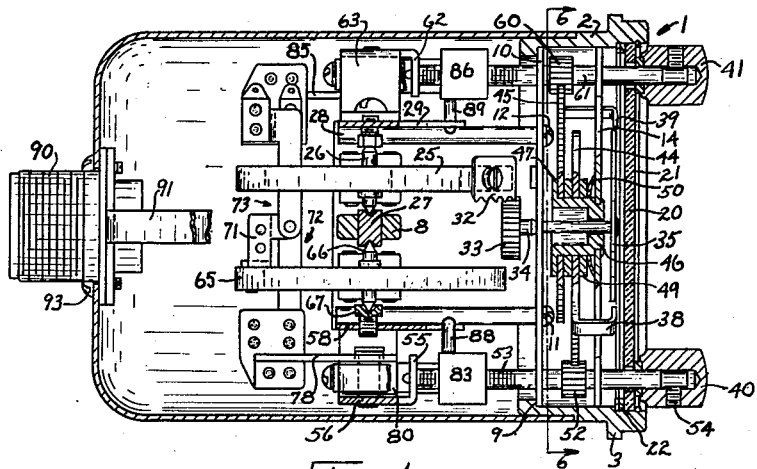
Figure 2:
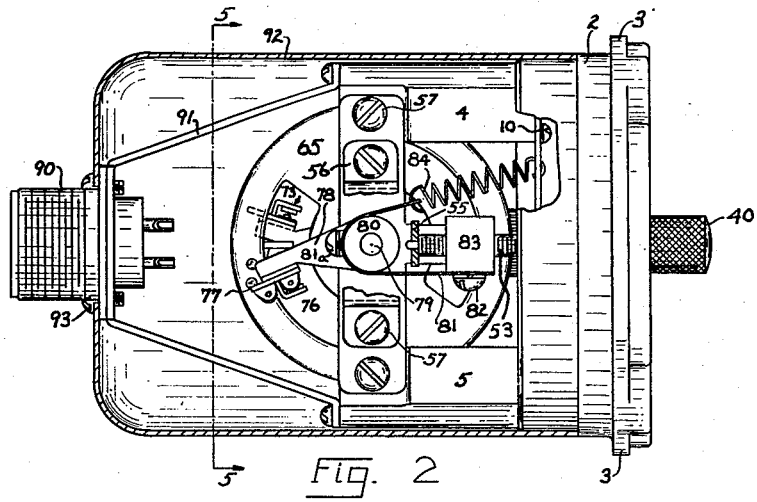
Fig. 2 is a side view of the instrument with the casing cut away to show the interior construction.
Figure 3:
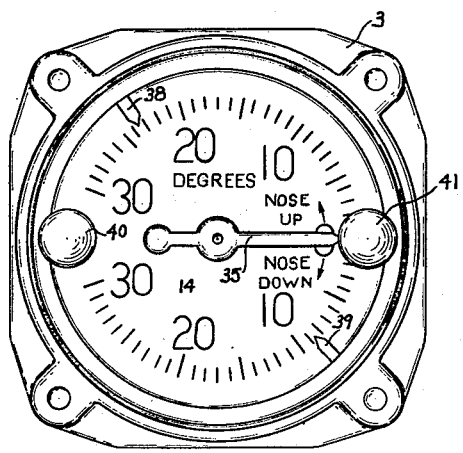
Fig. 3 is a front view.

As shown more clearly in Fig. 1, the periphery of the wheel member 25 facing the front of the instrument carries a toothed ribbon member 32. This ribbon member is secured to the wheel 25 at a number of points so that it assumes a curvature concentric with that of the periphery of the wheel. The teeth of the member 32 cooperate with a spur gear 33 which is carried on a shaft 34. This shaft extends through the plates 10 and 14 and carries a pointer 35 which cooperates with the dial 14 to indicate the inclination of the instrument. The parts are arranged so that when the instrument is level, the pointer assumes the zero position on the dial, as shown in Fig. 3. If the instrument is tilted counter-clockwise, as seen in Fig. 2, the wheel 5 will remain stationary due to the weight 30. The gear 33 at this time, however, will move upwardly relative to the toothed member 32, thus causing the gear 33 to rotate clockwise as seen from the front of the instrument. Thus the pointer 35 will be caused to indicate the degree of inclination of the instrument on the lower portion of the dial 14. If the instrument is rotated clockwise from the level position, the needle 35 will indicate the degree of inclination on the upper portion of the dial 14.

It will be noted that the wheel member 25 is relatively massive in construction relative to the weight 30. It will also be noted that the major portion of the mass of the wheel 25 is substantially spaced from the axle 26. This imparts a substantial rotational moment of inertia to the inclination responsive structure. This moment of inertia is quite large as compared to the force produced by the unbalanced weight 30. This arrangement serves to effectively dampen oscillation of the responsive member. This dampening requires no friction whatever in the parts. Consequently the instrument may be formed as friction free as possible so as to provide extreme accuracy in the measurement and indication of inclination.

It should be noted that the inclination responsive device above described is also responsive to acceleration. Thus if the plane in which the instrument is mounted should accelerate, the weight 30 will tend to be left behind. This will cause the wheel 25 to rotate counter-clockwise, as seen in Fig. 2, to a position in which the lateral component of force balances the force of acceleration. If the plane should decelerate, the opposite action will occur, that is, the wheel 25 will rotate clockwise as seen in Fig. 2, and thus rotate the needle 35 clockwise as seen in Fig. 3. This acceleration responsive feature combined with inclination response is of considerable value as a guide in bombing operations. Thus if the plane's inclination is such that the bombs would not fall clear of the plane, the bombardier is given notice of this fact. Similarly, if the plane is accelerating or decelerating to such an extent that it would be unsafe to drop the bombs, the instrument will indicate this fact. In addition, the instrument will integrate the combined effect of inclination and acceleration of the plane so as to indicate any unsafe condition caused by such combined effects.

It is desirable to provide pointers 38 and 39 cooperating with the dial 14 for indicating the safe limits at which the bombs can be dropped. Preferably these pointers should be readily adjustable so that they may be set in accordance with the characteristics of the bomb load being carried. In the embodiment shown in Fig. 3 the pointer 38 is adjusted by a knob 40 and the pointer 39 is adjusted by knob 41. The mechanism for providing such adjustment will now be described.

The pointer 38 extends through a slot 42 (Figs. 1, 4 and 6) between the base member and dial and is carried by a gear segment 43. The pointer 39 extends through a similar slot 44 and is carried by a gear segment 45. These gear segments are carried by a stationary hub member 46 through which the shaft 34 extends. The front end of this hub member is attached to the dial plate 14 and the rear of this member is formed with a flange 47 which is engaged by the gear segment 45. Suitable spacing and friction washers 49 are provided on each side of the gear segment 44. The washers and gear segments are held in position by means of a spiral spring member 50 interposed between the front spacing washer and the dial plate 14. This arrangement holds the gear segments 44 and 45 in tight but adjustable relationship.

The gear segment 44 is rotated by a pinion gear 52 which is carried by a shaft 53. This shaft extends through plate 10, dial 14 and glass 20, and at its outer end carries the knob 40 which is held in place by set screw 54. The other end of the shaft 53 is carried by an inturned portion 55 of a U-shaped bracket member 56. This bracket member is fastened by screws 57 (Fig. 5) to a strip 58 which is secured to the leg 7 of the upper bracket 4 and to the corresponding leg of the lower bracket 5. It will be apparent that when the knob 40 is rotated the gear segment 44 will be rotated, thereby moving the pointer 38 along the periphery of the dial. The gear segment 45 is rotated by a pinion gear 60 carried by a shaft 61, this shaft at its outer end carrying the adjusting knob 41, and at its inner end engaging an in-turned portion 62 of the U-shaped bracket member 63. This bracket member is secured to the strip 29 by means of screws 64.

In some cases it is desirable to actuate control devices, such as switches, when the inclination of the instrument reaches predetermined values. The present invention includes an arrangement for actuating such switches. Preferably the switches are actuated by a separate inclination or acceleration responsive device. This device consists of a wheel shaped member 65 which may be identical to the member 25. The wheel 65 is provided with an axle 66 having conical bearings, one bearing engaging the insert 27 and the other bearing being carried by an adjusting screw 67 which is carried by the strip 58. The wheel 65 is provided with a U-shaped weight 70 similar to the weight 30 on wheel 25. The wheel 65 is also provided with a bracket member 71 which is adapted to actuate switches generally indicated as 72 and 73.

Referring to the switch 72, this switch is formed of a relatively stiff blade 74 and a flexible blade 75 having suitable contacts at their outer ends. These switch blades extend through an arcuate slot 76 formed in the wheel 65 and are attached to a member 77 of insulating material. The member 77 is carried by the free end of a lever arm 78 which is pivoted to a shaft 79 attached to the U-shaped bracket member 56. This shaft is in alignment with the axle 66 of wheel 65. The lever 78 is attached to a pulley member 80 which carries a flexible member or actuating strip 81. One end of this strip is attached by a screw 82 to a traveling nut 83 which is carried by the screw-threaded inner end of the shaft 53. The other end of the strip 81 is attached to a spring 84, the other end of which is secured to the cross plate 10. The mid-portion of the strip 81 is attached by screw 81a to the pulley 80 for preventing any slipping of this strip on the pulley. It will be apparent that rotation of the knob 40 will rotate the shaft 53, thereby causing longitudinal movement of the traveling nut 83, this in turn causing rotation of the lever 78 about its pivot. Thus rotation of the knob 40 serves to vary the angular position of the lever arm 78 and thus bodily shifts the switch 72 concentrically with the wheel 65. It will be apparent that the flexible blade 75 is biased away from the rigid blade 74 of the switch 72. However, when the instrument is tilted clockwise, as seen in Fig. 2, the bracket member 71 will remain stationary, while the switch 72 will be raised bodily toward the bracket member. When the instrument is tilted to the predetermined point, the flexible switch member 75 will engage the bracket member 71 and thus remain stationary until the rigid switch blade 72 contacts it for closing the switch. By rotating the lever 78 about its pivot the degree of clockwise inclination at which switch 72 closes may be adjusted. It will be apparent that by properly arranging the parts, the pointer 38 which is actuated by the knob 40, may be caused to indicate the inclination at which switch 72 closes. It should here be noted that the adjusting mechanism for the pointer 38 and the adjusting mechanism for the switch 72 are both straight line mechanisms, that is, the movements of the pointer and switch are in straight line relationship with movement of the knob 40. Consequently the pointer 38 will indicate accurately the adjustment of the switch throughout its entire range of adjustment.

The switch 73 is similar in construction to the switch 72 and extends through a slot in the wheel 25. This switch is carried by a lever 85 which is rotated about its pivot in the same manner as lever 78 by a traveling nut 86 carried on the shaft 61. Thus rotation of the adjusting knob 41 serves to adjust the switch 73 and also to adjust the pointer 39 so as to indicate the adjustment of this switch. The traveling nuts 83 and 86 are preferably provided with pins 88 and 89 which engage suitable slots formed in the strips 58 and 29. This arrangement serves to prevent rotation of the nuts.

The switches 72 and 73 are connected by pigtail connections (not shown) to an electrical connector member 90 of usual construction. This connector member is supported upon a rearwardly extending U-shaped bracket 91 which is secured to the rear faces of the bracket members 4 and 5. The instrument mechanism is preferably protected by a casing 92 which is held in place by screws 93 carried by bracket 91.

Figure 7:
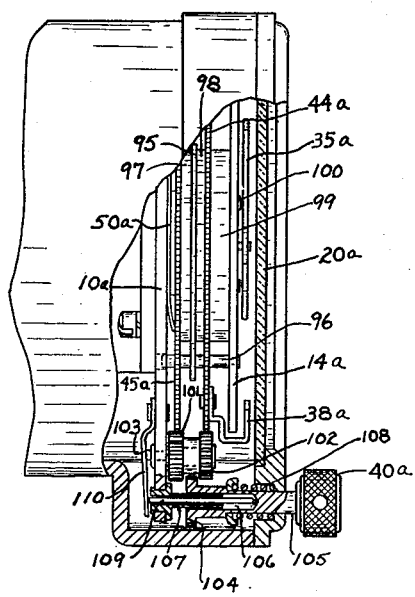
Fig. 7 is a view similar to Fig. 4, but showing a modification.

Referring to Fig. 7, this figure shows a modified arrangement for adjusting the markers on the dial. In this figure, the knob 40a is adapted to adjust one marker when it is pushed in, and to adjust the other marker when it is pulled out. In this embodiment of the invention, the gear segment 44a adjusts the marker 38a, and the gear segment 45a adjusts the other marker, not shown. These gear segments are mounted in a manner similar to the corresponding segments in Fig. 1. However, in this case the friction washer arrangement is somewhat modified. In order to prevent movement of one gear segment from causing movement of the other segment, a stationary plate 95 is interposed between the two gear segments. This plate is held stationary by means of a pin 96 having one end supported in the dial plate 14a, and its other end secured to a cross plate 10a. The gear segments 44a and 45a are provided with arcuate slots through which the pin 96 extends, this arrangement permitting rotation of the gear segments within predetermined limits. Suitable friction washers 97 and 98 are located on each side of the stationary plate 95 and engage the gear segments 45a and 44a respectively. A spacing washer 99 is interposed between the gear segment 98 and the dial plate 10, and a spring member 50a is interposed between the gear segment 45a and the cross plate 10a. This arrangement holds the various parts in the relation shown and imparts friction to the gear segments 44a and 45a, and thus holds the segments in stationary but adjustable relationship. Preferably an arrangement is provided for adjusting the amount of friction which holds the gear segments in place. In the present embodiment of the invention this friction adjustment consists of screws 100 which extend through plates 10a and 14a, the gear segments being provided with arcuate slots for receiving such screws. The screws 100 also serve to secure the dial plate 14a to the cross plate 10a.

The gear segments 44a and 45a mesh with spaced idler gears 101 and 102 which are carried by a shaft 103 attached to the cross plate 10a. These idler gears are adapted to cooperate with a gear 104 which is formed on the shaft 105 which carries the adjusting knob 40a. The left hand end of the shaft 105 is hollow, as indicated at 106, and fits over a suitable hollow guide bushing 107 which is carried by the cross plate 10. A spring 108 surrounds the shaft 105 and serves to press this shaft inwardly. A pin 109 extends through the hollow guide bushing 107 and engages the end of the hollowed out portion 106 formed in shaft 105. This pin 109 is urged inwardly by a leaf spring 110 which is secured to the cross plate 10a. With the parts in their normal positions, it will be observed that the spring 108 serves to press the shaft 105 inwardly and that the spring 110 acts through pin 109 to press this shaft outwardly. The spring 110 is formed strong enough to overcome spring 108 and thus the shaft 105 is pressed outwardly until spring 110 engages bushing 107. Thus the gear 104 is normally held in the position shown in which it is disengaged from both idler gears. When it is desired to adjust the pointer 38a, the knob 40a is pulled outwardly against the action of spring 108, this causing the gear 104 to mesh with the idler gear 102. Thus when knob 40a is now rotated, the gear segment 44a will be rotated and thus adjust the pointer 38a. When the pointer 40a is released, the spring 108 pushes it inwardly to the neutral position shown. When it is desired to adjust the other pointer, the knob 40a is pushed inwardly against the action of spring 110, this causing the gear 104 to engage the idler gear 101. Thus when the knob 40a is now rotated, the gear segment 45a will be rotated and thus the other marker will be adjusted. When knob 40a is released, the spring 110 will return the parts to the neutral position as shown.

From the foregoing description it will be seen that the present invention provides a very accurate inclination and/or acceleration responsive device in which the parts may be made entirely free of friction, and in which oscillation is nevertheless effectively dampened. It will also be seen that this arrangement is adapted to either actuate an indicating device, such as a pointer, or to operate suitable control devices, such as switches. It will also be seen that the present invention provides a simple and practical arrangement for adjusting the point at which the control devices are actuated and for indicating the adjustment of such control devices. While the invention is particularly useful as a safety indicating device for bombing operations, its utility is not limited to such use. Inasmuch as many modifications and applications may be made without departing from the scope of the invention, it is desired to be limited only by the appended claims.

What is claimed is:

1. An instrument of the character described comprising, a base structure, a dial carried by said base structure, a pivoted responsive member located behind the dial and arranged to rock about its pivot in a direction perpendicular to the dial, means including a pointer cooperating with the dial for indicating the angular position of the responsive member with respect to the base structure, an adjustable marker on the dial, an adjusting screw extending forwardly of the dial for adjusting said marker, a control member arranged for actuation by said responsive member, adjustable mounting means for said control member, said mounting means being rotatable about a pivot in substantial alignment with the pivot of said responsive member, and means actuated by said adjusting screw for rotating said adjustable mounting means.

2. An instrument of the character described comprising, a base structure, a dial carried by said base structure, a pivoted responsive member located behind the dial and arranged to rock about its pivot in a direction perpendicular to the dial, means including a pointer cooperating with the dial for indicating the angular position of the responsive member with respect to the base structure, an adjustable marker on the dial, an adjusting screw extending forwardly of the dial for adjusting said marker, a control member arranged for actuation by said responsive member, adjustable mounting means for said control member, said mounting means being rotatable about a pivot in substantial alignment with the pivot of said responsive member, a pulley for rotating said adjustable mounting means, an elongated flexible member engaging the pulley so as to rotate the same, a spring attached to one end of the flexible member, a travelling nut carried by said adjusting screw, the other end of the elongated member being attached to said travelling nut.

3. A control instrument comprising, a control device, rotatable adjusting means for adjusting said control device, a pulley for rotating said rotatable adjusting means, an elongated flexible member engaging said pulley so as to rotate the same, a spring attached to one end of the flexible member, an adjusting screw, a travelling nut carried by said adjusting screw, the other end of said flexible member being connected to said travelling nut.

4. A device of the character described comprising, a base structure, a dial carried by said base structure, a pointer also carried by said base structure and cooperating with said dial, a shaft for rotating the pointer, a gear engaging the shaft for rotating the same, a wheel shaped structure disposed perpendicular of the dial and pivoted to the base structure, said wheel shaped structure being formed with a substantial portion of its mass asubstantially spaced from the pivot so as to provide a relatively large rotational moment of inertia for dampening oscillation, said wheel shaped structure also being constructed so that its pivot is slightly off center with respect to its center of gravity whereby it tends to assume a fixed position due to the effect of gravity, said wheel shaped structure also being formed as a gear at a part of its periphery for engaging said first mentioned gear whereby the dial and pointer indicate the relative positions of the wheel shaped structure and base structure, a pair of markers cooperating with said dial for indicating predetermined limits of inclination, a first gear located behind the dial for carrying one of said pointers, a second gear located behind the dial for carrying the other of said pointers, a single adjusting shaft extending forwardly of said dial for adjusting both of said pointers, said shaft being movable longitudinally and carrying gear means adapted to selectively engage one or the other of said gears, and spring biasing means for biasing said shaft to an intermediate longitudinal position in which the gear means is disengaged from both of said gears.

HOMER E. MALONE.